(12) United States Patent  (10) Patent No.: US 8,746,635 B2
Kim et al.  (45) Date of Patent: Jun. 10, 2014

(54) SUPPORTING APPARATUS FOR DISPLAY DEVICE

(75) Inventors: Sang-Hoon Kim, Gumi (KR); Kyung-Wook Kim, Gumi (KR)

(73) Assignee: LG Electronics Inc., Seoul (KR)

( * ) Notice: Subject to any disclaimer, the term of this patent is extended or adjusted under 35 U.S.C. 154(b) by 813 days.

(21) Appl. No.: 12/524,436

(22) PCT Filed: Nov. 5, 2008

(86) PCT No.: PCT/KR2008/006517
§ 371 (c)(1),
(2), (4) Date: Jul. 24, 2009

(87) PCT Pub. No.: WO2009/066885
PCT Pub. Date: May 28, 2009

(65) Prior Publication Data
US 2010/0006725 A1  Jan. 14, 2010

(30) Foreign Application Priority Data
Nov. 20, 2007 (KR) .................. 10-2007-0118252

(51) Int. Cl.
*A47F 5/12* (2006.01)
*E04G 3/00* (2006.01)
*A47H 1/10* (2006.01)

(52) U.S. Cl.
USPC ........... 248/133; 248/917; 248/918; 248/919; 248/920; 248/921; 248/922; 248/923; 248/292.14; 248/286.1; 248/284.1; 248/371; 248/299.1; 248/274.1; 248/276.1; 248/287.1; 403/113; 403/116; 403/117; 361/681; 361/682; 361/683

(58) Field of Classification Search
USPC ......... 248/324, 917–924, 133, 229.1, 292.14, 248/286.1, 284.1, 371, 299.1, 274.1, 276.1, 248/287.1, 298.1; 403/113, 116, 117; 361/681–683
See application file for complete search history.

(56) References Cited

U.S. PATENT DOCUMENTS 5,321,579 A * 6/1994 Brown et al. ............ 361/679.06
5,624,202 A * 4/1997 Grierson ..................... 403/327
(Continued)

FOREIGN PATENT DOCUMENTS

CN    1818452 A     8/2006
CN    101042941    9/2007
(Continued)

OTHER PUBLICATIONS

International Search Report dated Feb. 12, 2009.
(Continued)

*Primary Examiner* — Terrell McKinnon
*Assistant Examiner* — Christopher Garft
(74) *Attorney, Agent, or Firm* — Ked & Associates, LLP

(57) ABSTRACT

A supporting apparatus for a display device is provided. The supporting apparatus may include a stationary unit coupled to an installation site, a device supporting unit that supports the display device, a connection unit that connects the stationary unit to the device supporting unit and that guides motion of the device supporting unit, and a tilting frictional unit interposed between the connection unit and the device supporting unit to guide a tilting motion of the device supporting unit. The tilting frictional unit may include a first arc member fixed to the connection unit and a second arc member fixed to the device supporting unit. The first and second arc members contact each other to generate frictional force.

19 Claims, 15 Drawing Sheets

(56) References Cited

U.S. PATENT DOCUMENTS

| | | | |
|---|---|---|---|
| 5,941,497 A * | 8/1999 | Inoue et al. | 248/514 |
| 6,209,974 B1 * | 4/2001 | Goto et al. | 312/7.2 |
| 6,766,994 B2 * | 7/2004 | Serbinski et al. | 248/371 |
| 7,334,766 B2 * | 2/2008 | Ligertwood | 248/292.13 |
| 7,438,269 B2 * | 10/2008 | Pfister et al. | 248/292.14 |
| 7,448,584 B2 * | 11/2008 | Chen et al. | 248/278.1 |
| 7,641,163 B2 * | 1/2010 | O'Keene | 248/292.14 |
| 7,753,332 B2 * | 7/2010 | O'Keene | 248/292.14 |
| 7,891,622 B1 * | 2/2011 | O'Keene | 248/292.13 |
| 2005/0219723 A1 | 10/2005 | Liang | 359/879 |
| 2005/0263659 A1 | 12/2005 | Pfister et al. | 248/289.11 |
| 2006/0065800 A1 * | 3/2006 | Bremmon | 248/274.1 |
| 2007/0176067 A1 * | 8/2007 | Monaco | 248/284.1 |
| 2007/0194196 A1 | 8/2007 | Pfister et al. | |
| 2007/0205340 A1 * | 9/2007 | Jung | 248/125.9 |
| 2007/0221807 A1 * | 9/2007 | Park | 248/324 |
| 2007/0262215 A1 * | 11/2007 | Tan | 248/201 |
| 2008/0315049 A1 * | 12/2008 | Bailo et al. | 248/176.1 |

FOREIGN PATENT DOCUMENTS

| | | |
|---|---|---|
| EP | 0 834 792 B1 | 4/1998 |
| FR | 2 782 400 A1 | 2/2000 |
| KR | 10-2002-0092698 | 12/2002 |
| KR | 10-2005-0073654 | 7/2005 |
| KR | 10-2006-0034351 | 4/2006 |
| WO | WO 2006/132781 A2 | 12/2006 |

OTHER PUBLICATIONS

Chinese Office Action dated Dec. 31, 2010 issued in Application No. 200880003728.2.

European Search Report dated Jan. 25, 2011 issued in Application No. 08 85 1619.

Chinese Office Action dated Feb. 3, 2012.

* cited by examiner

SUPPORTING APPARATUS FOR DISPLAY DEVICE

TECHNICAL FIELD

The present disclosure relates to a supporting apparatus for a display device.

BACKGROUND ART

Generally, a display device is for display an image. Recently, flat panel displays that can be formed in a two-dimensional flat shape have been released.

Since the flat panel display is provided in the form of a planar structure and is lighter in weight, the user washes the display with the display mounted on a wall. Considering this circumference, a variety of wall-mounting type supporting apparatus for the flat panel display have been released.

DISCLOSURE OF INVENTION

Technical Problem

Embodiments provide a supporting apparatus for a display device, which can realize reduction in a size of the product, reduction in a portion that can be observed from an external side, improvement of the reliability of the product, smooth operation of the product, stable maintenance of a predetermined position, conformance with respect to a built-in mechanism, reduction in manufacturing costs, simplification of the manufacturing process, reduction in distribution costs, and the like.

Technical Solution

In one embodiment, a supporting apparatus for a display device includes: a stationary unit fixed at a fixing location; a device supporting unit supporting the display device; a connection unit connecting the stationary unit to the device supporting unit and guiding motion of the device supporting unit; and a tilting frictional unit interposed between the connection unit and the device supporting unit and guiding tilting motion of the device supporting unit in a vertical direction, wherein the tilting frictional unit includes: a first arc member fixed to the connection unit; and a second arc member fixed to the device supporting unit, wherein the first and second arc members contact each other to generate frictional force.

In another embodiment, a supporting apparatus for a display device includes: a stationary unit; a plurality of first connection units each having a first end rotatably connected to the stationary unit; a second connection unit to which second ends of the first connection units are slidably connected; a device supporting unit that is capable of tilting relative to the second connection unit; and a tilting frictional unit connecting the second connection unit to the device supporting unit and guiding tilting motion of the device supporting unit.

In still another embodiment, a supporting apparatus for a display device includes: a stationary unit; a plurality of first connection units rotatably connected to the stationary unit; a second connection unit to which the first connection units are rotatably connected; a device supporting unit that is capable of tilting relative to the second connection unit; and a tilting frictional unit connecting the second connection unit to the device supporting unit and guiding tilting motion of the device supporting unit.

Advantageous Effects

According to the embodiments, a size of the product can be reduced and a portion that can be observed in a lateral direction of the display device is significantly reduced, thereby improving a sense of satisfaction of the user.

In addition, the reliability of the product can be improved while enabling all of motions that should be realized in the display device. Further, the product can smoothly operate without generating frictional force and noise. In addition, the position that is set by the user s manipulation can be stably maintained.

Furthermore, since the supporting apparatus is designed such that a built-in mechanism can be conveniently inserted and mounted, the response to the built-in structure is excellent. Therefore, the manufacturing costs can be reduced and the packaging and distributing costs can be also reduced.

BRIEF DESCRIPTION OF THE DRAWINGS

FIGS. 2 to 4 are views illustrating an operation of the supporting apparatus for the display device according to the first embodiment, wherein FIG. 2 is a view illustrating a horizontal swivel operation in a left-right direction of the supporting apparatus, FIG. 3 is a view illustrating a frontward moving operation of the supporting apparatus, and FIG. 4 is a view illustrating a vertical tilting operation.

FIGS. 7 and 8 are side views illustrating a mounting state of the display device on the supporting apparatus, wherein FIG. 7 illustrates a normal installation state and FIG. 8 illustrates an installation state in a built-in structure.

MODE FOR THE INVENTION

Hereinafter, embodiments will be described with reference to accompanying drawings.

Figure 1:
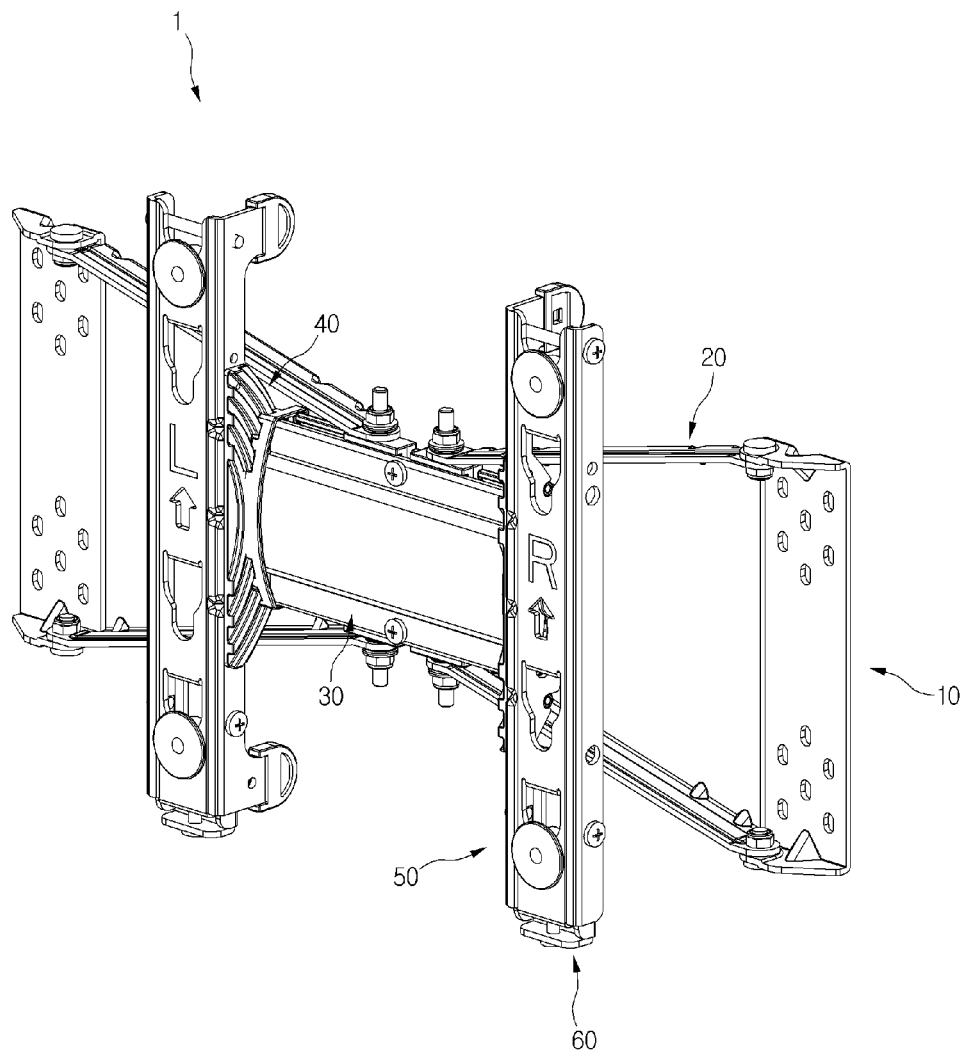
FIG. 1 is a perspective view of a supporting apparatus for a display device according to a first embodiment.

FIG. 1 is a perspective view of a supporting apparatus for a display device according to a first embodiment.

Referring to FIG. 1, a supporting apparatus 1 for a display device of a first embodiment includes a stationary unit 10 fixed on a mounting location such as a wall, a first connection unit 20 rotating about a vertical axis relative to the stationary unit 10, a second connection unit 30 performing sliding motion relative to the first connection unit 20, a device mounting unit 50 performing rotation about a horizontal axis relative to the second connection unit 30 and mounting the display device, and a tilting frictional unit 40 disposed between the second connection unit 30 and the device mounting unit 50 and providing frictional force against tilting motion in a vertical direction.

Here, a pair of the stationary units 10 are provided at left and right sides and a pair of the first connection units 20 are provided at left and right sides. The pair of the first connection units 20 have respective first ends that are slidably connected to the second connection unit 30 to enable the second connection unit 30 to move in a horizontal direction.

A pair of the device mounting unit 50 are provided at left and right sides to stably support the display device.

The tilting frictional unit 40 is provided on a contacting portion between the second connection unit 30 and the device mounting unit 50 to provide, when the device mounting unit 50 intends to rotate about the horizontal axis, frictional force to enable the device to remain at an angle set by the user.

The device supporting unit 50 is provided with a height adjusting unit 60 that can finely adjust a vertical height of the display device. The height adjusting unit 60 is designed to adjust the vertical height of the display device when the stationary unit 10 has wrong location selection with respect to the wall.

The following will describe an operation realized by the above-described supporting apparatus and a structure realizing the operation.

Figure 2:
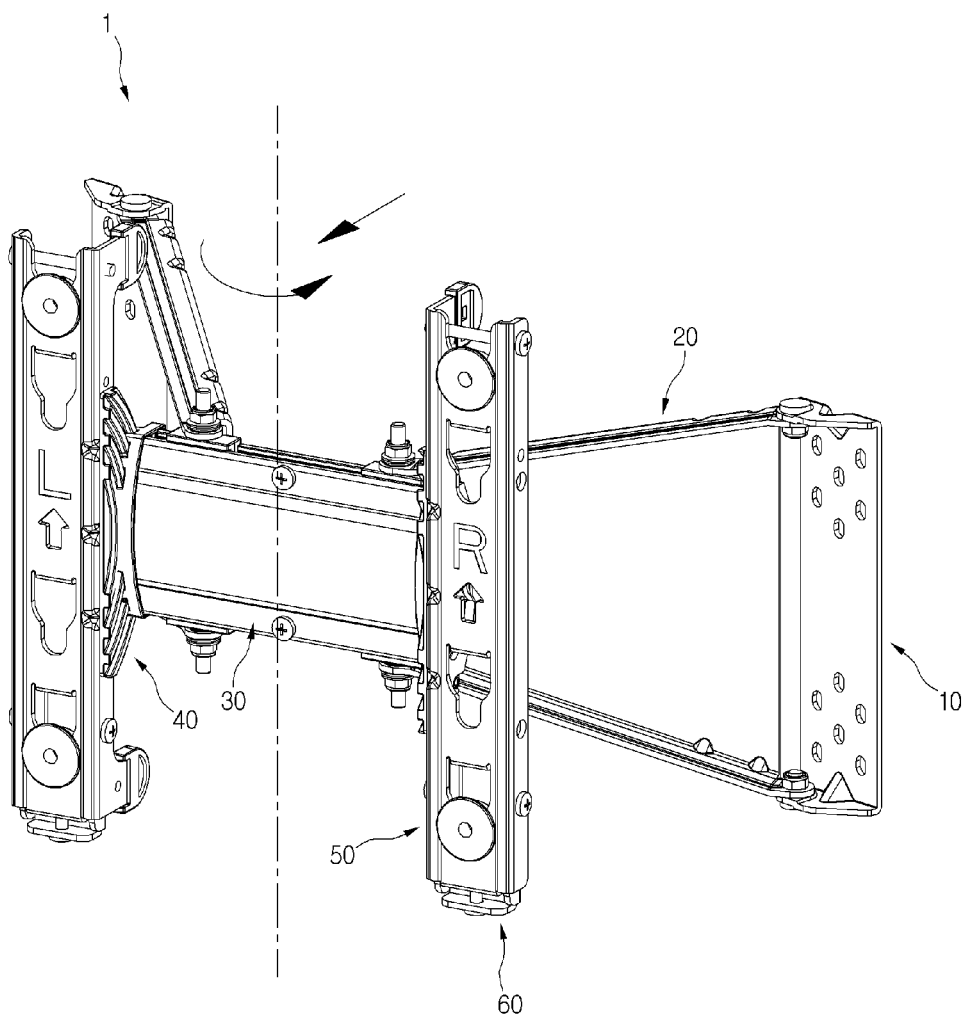
Figure 3:
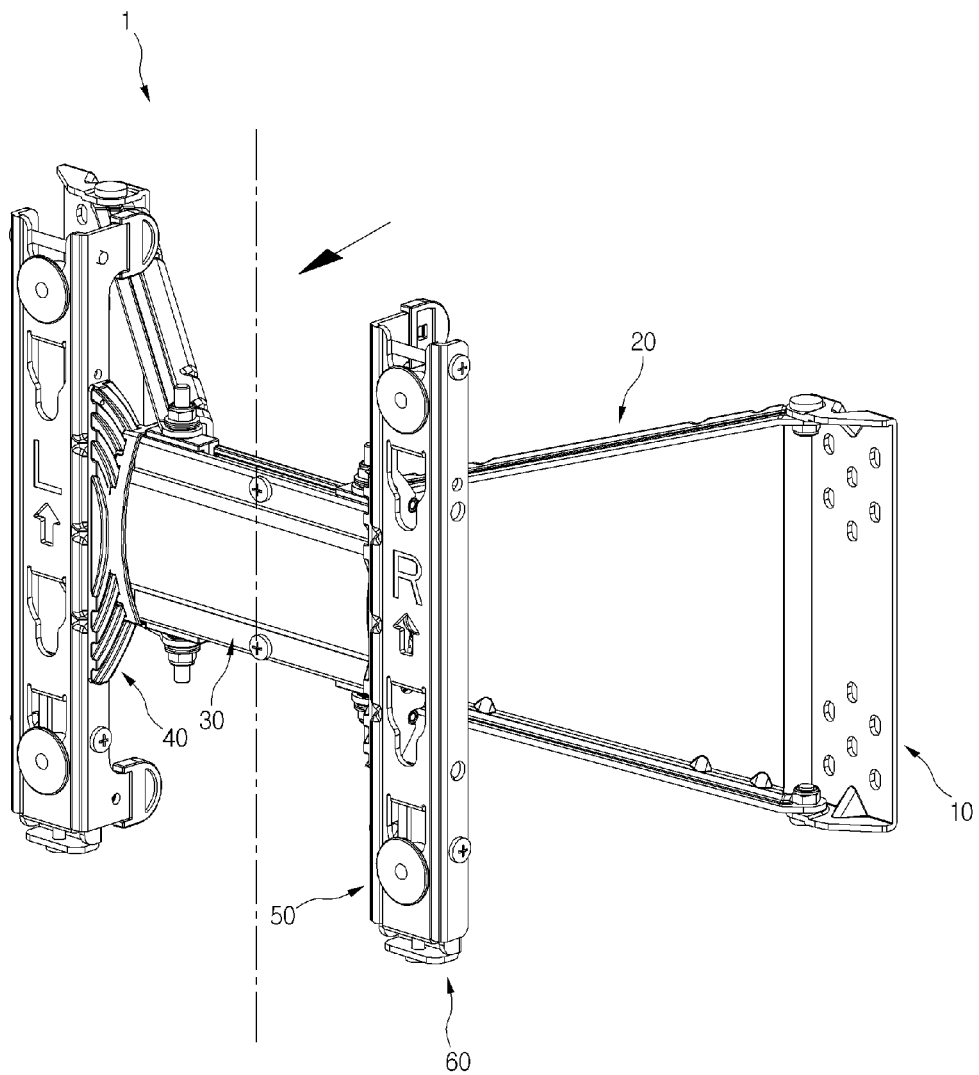
Figure 4:
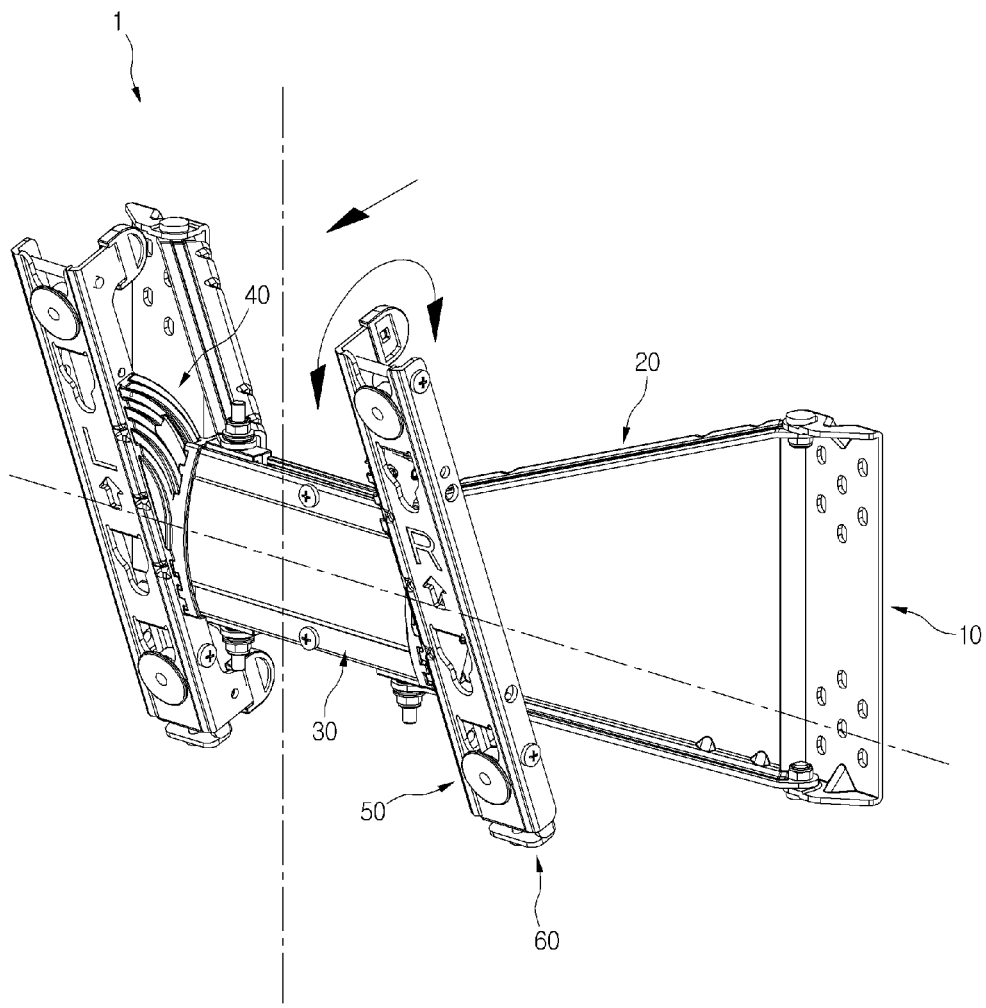

FIGS. 2 to 4 are views illustrating an operation of the supporting apparatus for the display device according to the first embodiment. FIG. 2 is a view illustrating a horizontal swivel operation in a left-right direction of the supporting apparatus, FIG. 3 is a view illustrating a frontward moving operation of the supporting apparatus, and FIG. 4 is a view illustrating a vertical tilting operation.

Referring to FIG. 2, since relative points where inner ends of the pair of the first connection units 20 to the second connection unit 30 vary, rotational angles of the first connection units 20 may be different from each other. This is caused by the slide motion of the first connection units 20 relative to the second connection unit 20. By this operation, the second connection unit 30 is in a state where it rotated counterclockwise in FIG. 2.

At this point, if the display device is initially in close contact with the wall, the display device is first drawn outward by a predetermined distance and subsequently swiveled in the horizontal direction.

Referring to FIG. 3, although the relative points where the inner ends of the pair of the first connection units 20 to the second connection unit 30 may vary, the rotational angles of the first connection units 20 are identical to each other. That is, since the rotational angles of the first connection units 20 are identical to each other, the left-right swivel angles of the first connection units 20 are identical to those of the installing state. However, since the inner ends of the first connection units 20 are capable of sliding relative to the second connection unit 30, the display device can move the left-right direction by a predetermined distance even when the display device is in a state where it moved frontward. At this point, a distance within which the display device can move is defined when one of the inner ends of the first connection units 30 reaches a movement limitation of the second connection unit 30. The movement limitation may be defined by opposite end portions of the second connection unit 30 a stopper member disposed on an approximately middle portion of the second connection unit 30.

The frontward/rearward movement of the display device may be applied when the user wishes to move the display device away from the wall, to move the display device toward the wall, to swivel the display device in the left-right direction, or to tilt the display device in the up-down direction.

Further, after the display device moves frontward, the display device may be translated to a certain degree in the left-right direction. This can more improve the satisfaction of the user watching the display device.

In addition, a range within which the display device can be translated in the left-right direction is proportional to the distance within which the display device can be drawn away from the wall. This is because that, as the frontward moving distance of the display device is getting longer, the inner end of the first connection unit 20 further moves away from the stopper member 33 and thus the moving limitation defined by the location of the stopper member 33 is getting longer in proportional thereto.

Referring to FIG. 4, the device supporting unit 50 is in a state where it rotated about the horizontal axis relative to the second connection unit 30. At this point, the rotational angle may be maintained by the frictional force provided by the tilting connection unit 40. At this point, if the display device is initially in a close contact state with the wall, the display device first moves away from the wall by a predetermined distance and tilts about the horizontal axis. When the display device tilts about the horizontal axis, it is preferable that the rear surface of the display device does not collide with the wall.

The above-described respective motions are individually independently performed, and thus the user can perform independently or partly simultaneously the vertical tilting motion, left-right swivel motion, and frontward-rearward motion of the display device.

Figure 5:
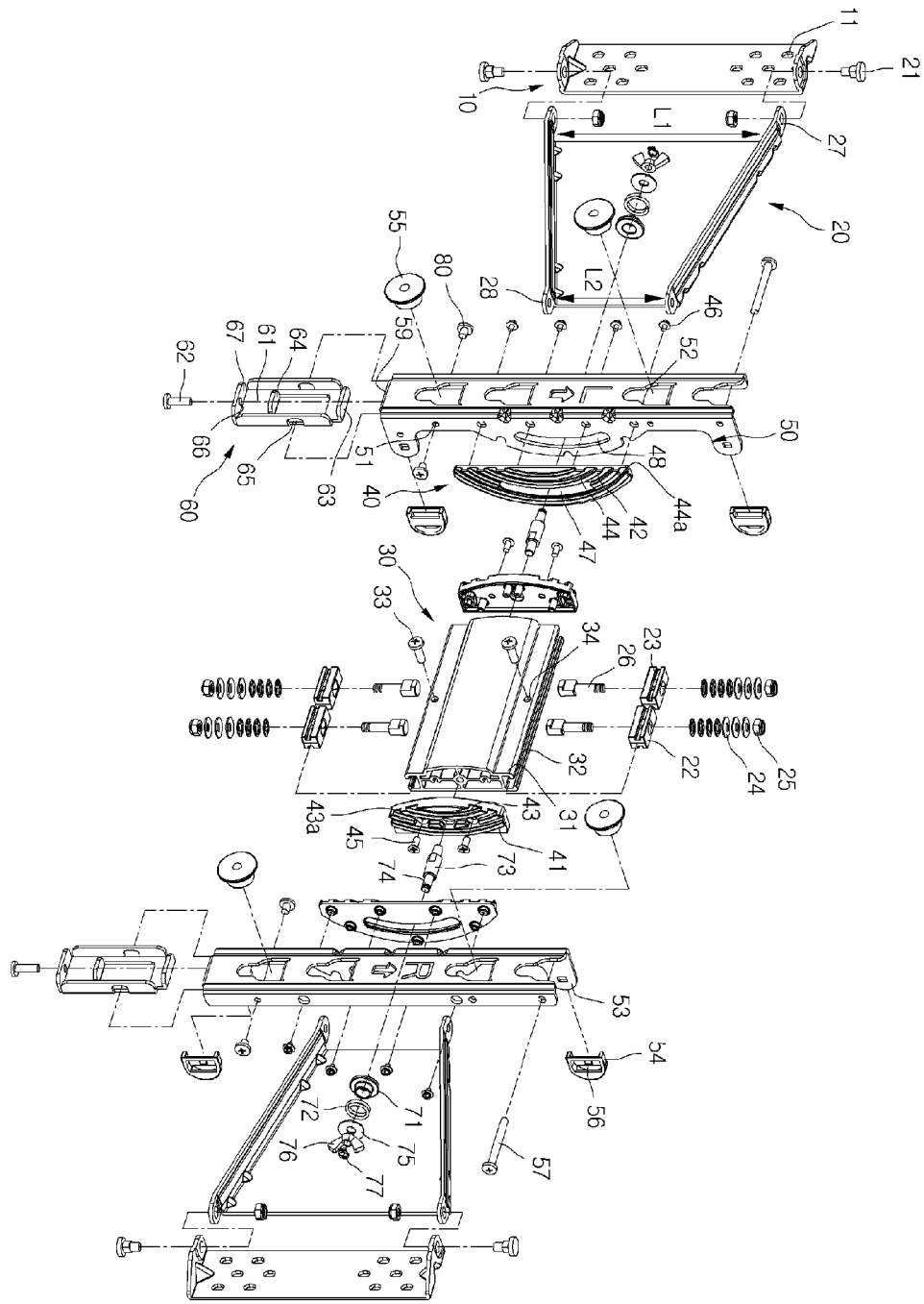
FIG. 5 is an exploded perspective view of the supporting apparatus for the display device according to the first embodiment.

FIG. 5 is an exploded perspective view of the supporting apparatus for the display device according to the first embodiment.

Components of the supporting apparatus of the first embodiment will now be described in detail with reference to FIG. 5. Here, when the components are symmetrically disposed in the vertical or horizontal direction, only one of them will be described and the description of the other will symmetrically invoke the description of the first one.

First, the stationary unit 10 vertically extends in the vertical direction and is mounted on the wall. The stationary unit extends in the vertical direction to a certain extent so as not to apply an excessive load to the wall while ensuring fixing strength above a predetermined level.

The stationary unit 10 is provided with holes through which fasteners such as screws are inserted and fixed. The holes 11 are at least two or more so that the proper number of the fasteners can be inserted in accordance with a state of the wall.

An outer end 27 of the first connection unit 20 is rotatably coupled to the stationary unit 10 by fasteners 21. Therefore, the first connection unit 20 is capable of rotating relative to the stationary unit 10. An inner end of the first connection unit 20 is connected to the second connection unit 30 to be capable of sliding.

A vertical width of the first connection unit 20 is gradually reduced as it goes inward. That is, a vertical length of the outer end of the first connection unit 20 is L1 and the inner end of the first connection unit 20 is L2 less than L1.

The reason for making the first connection unit 20 as described above is to prevent the connection units 20 and 30 from being viewed by naked eyes of the user. The second connection unit 20 cannot be almost viewed by the user through a gap between the display device and the wall.

Further, the second connection unit 30 is formed of aluminum through an extrusion process. The increase of the size of the extruded product causes the increase of the costs, the first connection unit 20 is possibly reduced in a size as it goes inward and thus the second connection unit 30 is reduced in the size. Further, as the size of the second connection unit 30 is reduced, the connection units 20 and 30 are not seen from the external side and thus the exterior appearance can be improved. Under these purposes, while the stationary unit 10 is designed to extend to a predetermined extent to provide strength relative to the wall, the second connection unit 30 should be small-sized to reduce material costs and to provide visibility. Considering this, the first connection unit 20 is designed such that lengths of the inner and outer ends thereof are different from each other.

Guides 31 are respectively formed on upper and lower portions of the second connection unit 30. Upper and lower ends of the respective guides 31 are formed in a contracted shape to provide recesses 32. Holes are formed through both side portions of the second connection unit 30 so that components of the tilting frictional unit 40 are coupled to the holes. The holes can be easily formed in the course of extruding the second connection unit 30.

Sliders 22 performing the sliding motion are partly inserted into the guides 31. Each of the sliders 22 is provided with a hook step 23 that supports a self-gravity of the corresponding slider 22 in a state where the hook step is hooked on the corresponding recess.

A coupling member 26 is coupled to the slider 22. The coupling member 26 is disposed at an interior of the slider 22 and projects outward to be coupled to the slider 22. Further, the coupling member 26 projects outward from the slider 22 in a state where it is coupled to the slider 22. The projecting portion 26 of the coupling member 26 passes through the inner end 28 of the first connection unit 20.

In addition, a fixing member such as a nut 25 is connected to a thread formed on a tail portion of the coupling member 26 with a washer 24 interposed between the nut 25 and the coupling member 26.

In order to enable the coupling member 26 to be coupled to the slider 22, at least a portion of a head of the coupling member 26 is large-sized. A hole formed in the slider 22 is provided with a portion that is gradually narrowed as it goes outward. Therefore, the coupling member 20 can be hooked on the slider 22.

According to the above-described structure, the inner end of the first connection unit 20 can freely perform the sliding motion in a length direction of the second connection unit 30. Such sliding motion has advantages of reducing noise during the sliding motion and easily controlling frictional force.

The tilting frictional unit 40 includes a first arc member 41 coupled to a side end portion of the second connection unit 30 and a second arc member 42 coupled to the device supporting unit 50. The first and second arc members 41 and 42 are provided with a plurality of frictional grooves 43 and 44 and a plurality of frictional projections 43a and 44a having a identical rotational center at a specific point. The frictional projections 43 and 44 are alternately formed with the frictional projections 43a and 44a.

The frictional projections 43a of the first arc member 41 are inserted into the frictional grooves 44 of the second arc member 42 and the frictional projections 44a of the second arc member 42 are inserted into the frictional grooves 43 of the first arc member 41.

As described above, by providing the frictional projections and grooves that correspond to each other on a single arc member, it can be expected to improve the frictional force and thus large frictional force can be attained even with a small member. This greatly affects in reducing a size of the components constituting the supporting apparatus.

In this embodiment, the frictional grooves 43 and 44 and the frictional projections 43a and 44a may be referred to as a guide unit for guiding the tilting operation of the device supporting unit.

Further, the arc members 41 and 42 are formed of synthetic resin to reduce noise generated on a contact surface of the arc members 41 and 42 and improve the frictional force. In more detail, the arc members 41 and 42 may be formed of engineering plastic such as polyoxymethylene to improve mechanical stability and realize proper frictional force.

The first arc member 41 is coupled to the second connection unit 30 by a coupling member 46. Here, since the coupling member 46 is coupled to a groove of the second connection unit 30 that is manufactured through the extrusion process, there is no need to form a separate screw hole.

Further, the second arc member 42 and the device supporting unit 50 are respectively provided with a second arc slot 48 and a first arc slot 47. A tiling limitation in an up-down direction of the device supporting unit 50 is defined by the arc slots 47 and 48.

If there is no above-described structure, it is impossible to define the tilting limitation in the up-down direction of the display device and thus the display device collides with the wall during tilting. This may cause the malfunction of the display device.

Even when smooth frictional force can be applied by the arc members 41 and 42, there is a need to adjust the frictional force between the arc members to enable a variety of display devices having different weights to be applied.

In order to adjust the frictional force, the supporting apparatus 1 further include, in addition to the device supporting unit 50 and the second arc member 42, a frictional adjusting unit (see 70 of FIG. 6) that couples the first arc member 41 to the second connection unit 30 and adjusts tightening force between the first arc member 41 and the second connection unit 30.

The frictional adjusting unit 70 includes a bar 73 functioning as a main shaft inserted through the device supporting unit 50, second arc member 42, first arc member 41, and second connection unit 30. An inner end portion of the bar 73 is fixed on a side end of the second connection unit 30 and an outer end portion of the bar 73 extends over the device supporting unit 50. Further, in order to adjust the tightening force, a lower plate 71, a spring 72, an upper plate 75, a tightening member 76, and a stopper ring 77 are sequentially inserted around the bar 73 at an outer side of the device supporting unit 50. The stopper ring 77 is fitted in a groove 74 formed on an outermost end of the bard to prevent the components from coming out.

By this structure, when the tightening member 76 is tightened, the biasing force of the spring is adjusted and thus the frictional force can be more precisely adjusted.

Figure 6:
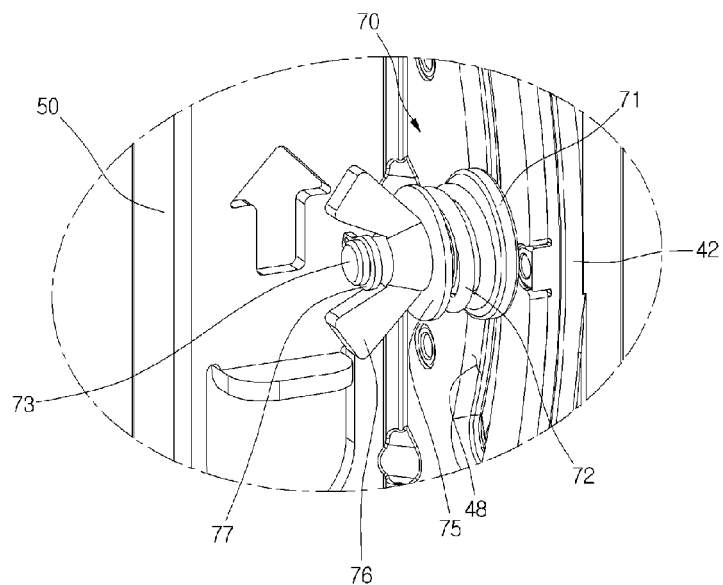
FIG. 6 is a perspective view illustrating a state where the frictional force adjusting unit is mounted on the device supporting unit.

FIG. 6 is a perspective view illustrating a state where the frictional force adjusting unit is mounted on the device supporting unit. The operation of the frictional adjusting unit will be described in more detail with reference to FIG. 6.

The tightening member 76 is formed on a rear surface of the device supporting unit 50 in a lateral direction. Therefore, the user can adjust the frictional force by rotating the tightening member 76. When the tightening member 76 rotates, contractile force for contracting the spring 72 is applied via the upper plate 75. By the contractile force, the spring 72 applies biasing force in a direction capable of coupling the lower plate 71, device supporting unit 50, second arc member 42, first arc member 41, slide connection unit 30 to each other, i.e., capable of increasing frictional force. That is, the spring 72 is designed to adjust normal force between the arc members.

Here, it can be noted that the frictional force can be more precisely adjusted by the spring 72. Namely, since the contraction section of the spring 72 is an interval in which the elastic force is adjusted, the coupling force of the arc members 41 and 42 is adjusted while widening and narrowing a length of the interval using a pitch of the threads. This advantage can be clearer when comparing with a structure where a distance between two members is not effective reduced when the frictional force is adjusted by adjusting the distance between the two members between which the washer is interposed.

Referring again to FIG. 5, the frictional force between the arc members 41 and 42 is provided by horizontal contacting surfaces of the frictional grooves 43 and 44 (i.e., inner surfaces of the frictional grooves 43 and 44) and by vertical contacting surfaces of the frictional grooves 43 and 44 (i.e., wall surfaces of the grooves). Further, the frictional force between the horizontal contacting surfaces is applied in a state where the frictional force is being adjusted by the frictional adjusting unit 70. The vertical frictional force is applied by the self-gravity of the display device. Furthermore, since the area of the contact surface increases by the frictional groove, sufficient frictional force is generated even by small elastic force generated by the spring 72 and thus sufficient frictional force is also attained by the frictional force between the arc members that is a signal device.

The device supporting unit 50 includes a plurality of device hooking members 52 on which a seating member 55 extending from the rear surface of the display device is disposed. The device supporting members 52 has an upper portion having a width and a lower portion having a width narrower than that of the upper portion. Therefore, the seating member 55 is inserted through an upper gap of the device supporting unit 50 and moves downward, thereby being supported on the device supporting unit 50. That is, the display device is supported on the device supporting unit 50.

Meanwhile, when the seating member 55 is disposed on only some of the device hooking members 52, there is a need to prevent the display device from being easily separated from the device supporting unit 50 when the user adjusts the position of the display device. To meet this need, an upper opening of the device hooking members 52 has a similar size to the seating member 55. Further, the uppermost device hooking member 52 is opened upward, a separation preventing step 57 such as a bolt is further installed.

The device supporting unit 50 is provided at a rear surface thereof with protrusions 53. Stoppers 54 are fitted around the respective protrusions 53. When the display device most closely moves toward the wall, the stoppers 54 prevent the generation of impact, which may be caused by excessive force and accurately set the seating position of the display device. The stoppers 54 are provided therein with respective insertion portions in which the respective protrusions 53 are inserted. Extreme ends of the respective protrusions 53 are fixed in the insertion portions 56 through, for example, shrinkage fit.

When only one of the stoppers 54 contacts the wall or all of the stoppers 54 do not contact the wall, it can be expected that the connection units 20 and 30 further move toward the wall or are in a state where they can swivel or tilt. In this case, the user smoothly pushes a portion of the display device, where the other stopper 54 is installed so that the other stopper 54 contacts the wall. Namely, the state where the display device can further move by the connection units 20 and 30 are guided by the stoppers 54 and thus the display device cannot move any more. In spite of this state (i.e., a state where the display device can keep moving in opposite directions by the connection units), the mounting structure can be stably maintained in a built-in structure.

At this point, four corners of the display device are inserted in accurate locations, it can be noted that the insertion locations are accurately set.

The supporting manipulation of the display device will be described in more detail with reference to side views of the supporting apparatus.

Figure 7:
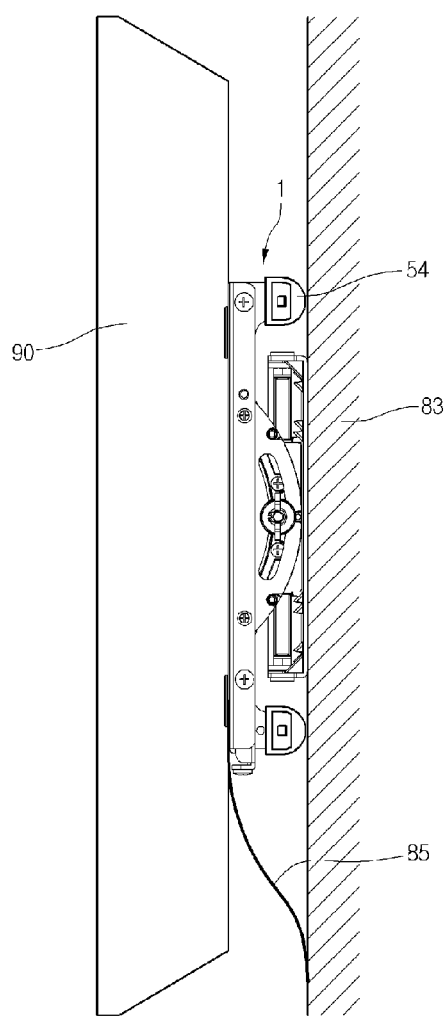
Figure 8:
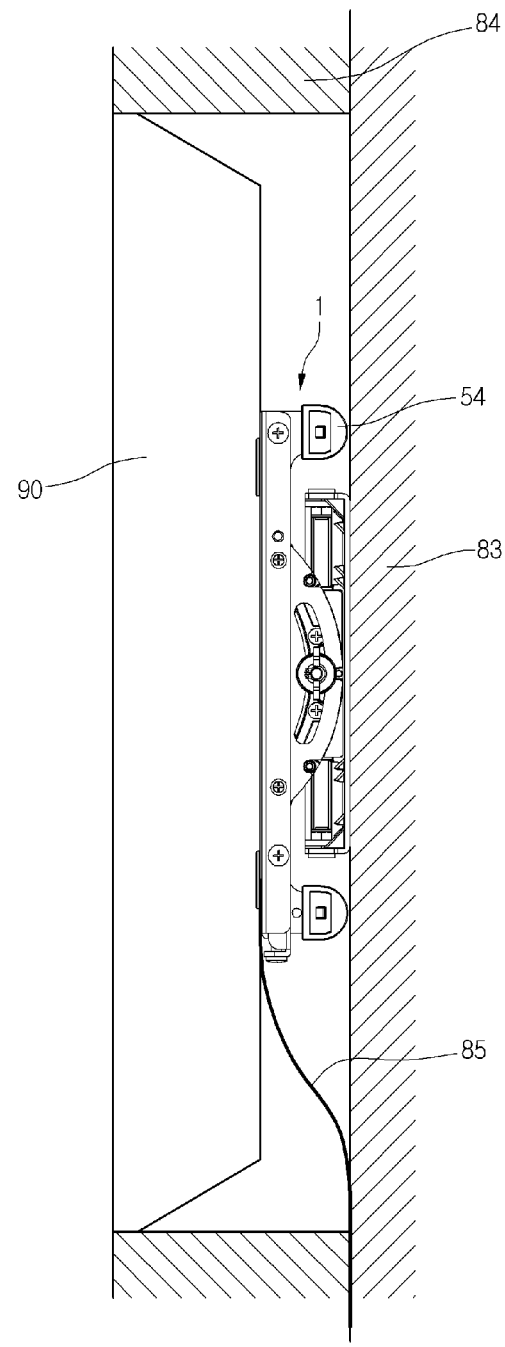

FIGS. 7 and 8 are side views illustrating a mounting state of the display device on the supporting apparatus. FIG. 7 illustrates a normal installation state and FIG. 8 illustrates an installation state in a built-in structure.

Referring to FIG. 7, in order to move the display device to the closest location to the wall, a variety of operative properties is realized and a portion that is observed from the external side is reduced, thereby improving the satisfaction of the user.

Further, it can be noted that impact that may be generated by acceleration during the pushing of the display device to completely move the display device toward the wall is absorbed by the stoppers 54. To realize this, the stopper 54 may be formed of a material such as rubber or plastic that is softer than metal.

Referring to FIG. 8, a case where a decoration space 84 is further provided at an outer side of the wall 83. The decoration space 84 is provided for receiving other units such as wires 85 to beautifully decorate an interior space. The display device 90 is inserted into the decoration space 84 such that an outer surface of the display device coincides with the decoration space 84. In this case, when a thickness of the display device does not coincide with the decoration space in accordance with the specification of the display device, a shape of other members such as the stoppers 54 may be varied. For example, when the display device is thicker, the stoppers are designed to be shorter. When the display device is thinner, the stoppers are designed to be longer. Accordingly, the display device can be beautifully installed regardless of the size of the display device received in the built-in structure.

Referring again to FIG. 5, the height adjusting unit 60 is further provided on a lower end of the device supporting unit 50. The height adjusting unit 60 is used to correct an installation error by a worker installing the supporting apparatus. That is, when the worker erroneously set a height of the stationary unit 10 or differently set left and right height levels during the installation of the supporting apparatus, the height adjusting unit 60 is used to correct these errors. Therefore, it is not required to make a height adjusted by the height adjusting unit 60 large.

The height adjusting unit 60 includes a supporter unit 61 mounted as an independent component at a lower portion of the device supporting unit 50, a coupling member 80 allowing the supporter unit 61 to be movably supported on the device supporting unit 50, a pushing member 62 for varying a relative height of the supporter unit 61 and the device supporting unit 50, and a lower end rib 59 performing a relative motion to the supporter unit 61 when the supporter unit 61 moves.

In more detail, the supporter unit 61 is provided holes 65 that are provided at both side portions to movably support the coupling member 80, first and second contacting portions 63 and 64 bent frontward to support the seating member 55, a supporting portion 67 that are directly pushed by the pushing member 62, and a hole 66 processed through the supporting portion 67 and inserted into the pushing member 62.

The operation and effects of the height adjusting unit 60 will now be described with reference to FIGS. 9 and 10. FIG.

Figure 9:
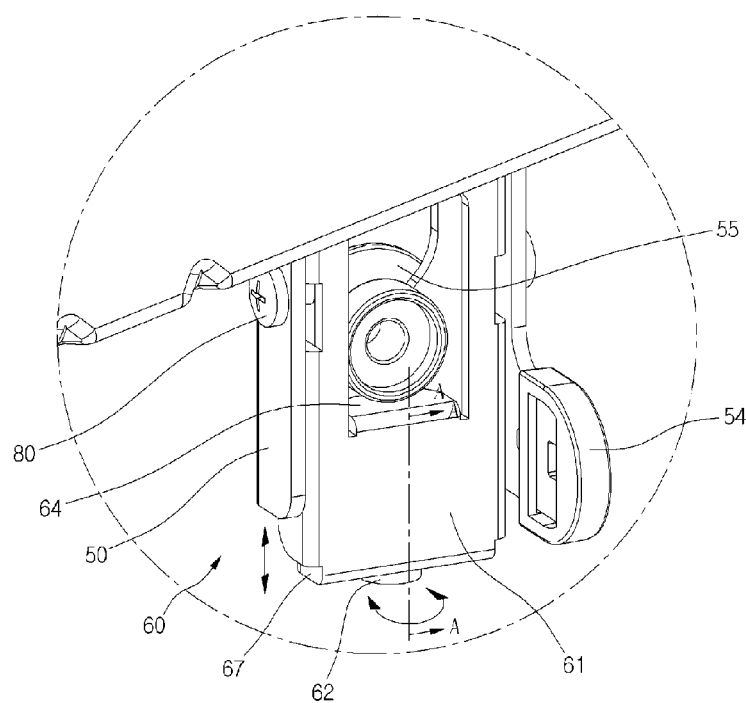
FIG. 9 is a rear perspective view of a height adjusting unit.
Figure 10:
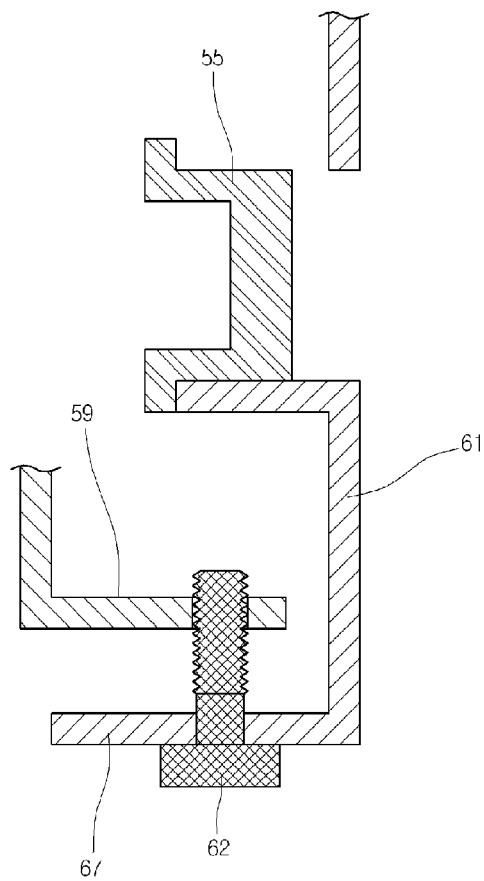
FIG. 10 is a cross-sectional view taken along line A-A of FIG. 9.

9 is a rear perspective view of the height adjusting unit and FIG. 10 is a cross-sectional view taken along line A-A of FIG. 9.

Referring to FIGS. 9 and 10, the pushing member 62 and the lower end rib 59 are engaged with each other while the pushing member 62 and the supporting portion 67 are separately structured without forced coupling relation such as the engagement. In this state, when rotating the pushing member 62, the pushing member 62 is further inserted around the lower end rib 59 and thus ascends or is further separated to move downward. That is, the pushing member 62 performs forcedly ascending/descending operation relative to the lower end rib 59 and the supporting portion 67 is hooked on the head of the pushing member 62 to ascend or descend together with the pushing member 62. Then, the lower end rib 59, i.e., the device supporting unit 50 do not experience the location change by the rotational operation of the pushing member 62 and the supporter 61 performs the ascending/descending operation by the rotational operation of the pushing member 62. In addition, since the seating member 55 is disposed on the supporter unit 61, the seating member 55 on which the display device is supported ascends or descends by the rotational operation of the pushing member 62, thereby adjusting the height of the display device.

In order to stably support the display device when performing the height adjusting operation, the seating member 55 is provided with the two contacting portions 63 and 64 that are disposed at upper and lower portions and supported by the supporter unit. Needless to say, even with only one contacting portion, the height adjusting unit 60 can operate. However, when two contacting portions are provided, the supporting can be stably realized.

Meanwhile, the height adjusting unit 60 can be more effective used in a case of the built-in structure shown in FIG. 8, in a case where the display device that should be inserted into the receiving space for the built-in structure is not inserted, or in a case where an installation error is clear relative to the outer line of the decoration space 84. In these cases, by minutely adjusting the height of the display device, the user satisfaction can be enhanced and there is no need to perform an excessive correcting work such as dissembling and reassembling works of the stationary unit 10.

Figure 11:
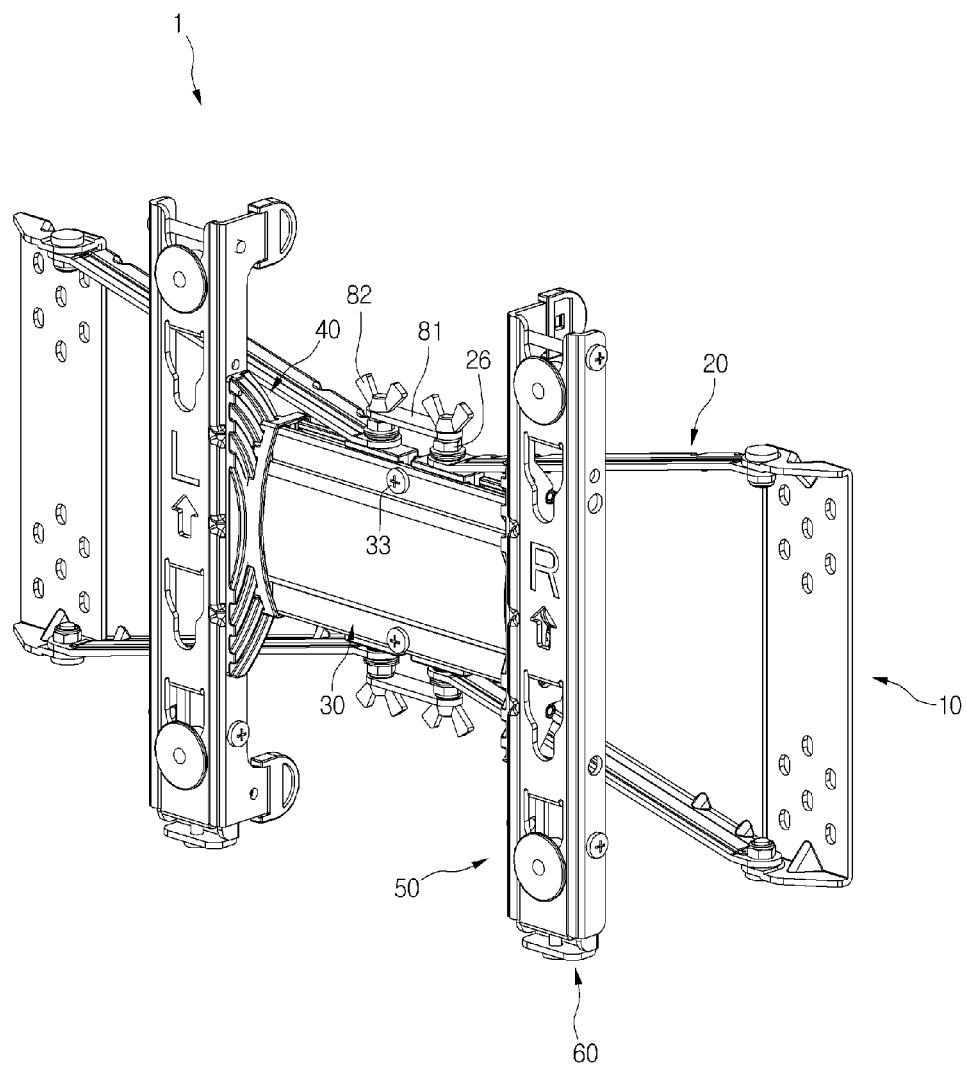
FIG. 11 is a perspective view of a supporting apparatus for a display device according to a second embodiment.

FIG. 11 is a perspective view of a supporting apparatus for a display device according to a second embodiment.

The second embodiment is identical to the first embodiment except for the improvement of package and deliver of the supporting apparatus when intending to use the supporting apparatus in a perfectly fixed state or sales only the supporting apparatus. Therefore, the components that are same as those of the first embodiment will not be described in this second embodiment.

Referring to FIG. 11, a pair of coupling members 26 for interconnecting a pair of slide connection units 30 and a pair of first connection units 20 are interconnected by a restriction connecting member 81.

The restriction connecting member 81 is formed of a plate member. The restriction connecting member 81 is provided with two holes in which the coupling members 26 are inserted. In order to fix the restriction connecting member 81, nuts 82 are fitted in the coupling members 26 to prevent the restriction connecting member 81 from being separated.

The coupling members 26 are provided in a state where they contact stopper members 33. By this structure, movement in a left-right direction is suppressed in a state where the display device closely contacts the wall and thus the damage of the display device by the collision with external devices and inconvenience in using can be prevented.

By the restriction connecting member 81, the movements of the connection units 20 and 30 are completely restricted. Therefore, after packing the product, the movement of the components in the package is prevented and the supporting apparatus can be stably maintained without the components penetrating the package even when external impact is applied to the package. Therefore, there is no need to use the Styrofoam or paper in order to maintain a posture of the supporting apparatus.

The embodiment can be applied in a like manner when the user intends to operate the display device in a state where the display device is completely fixed after the product is installed.

Figure 12:
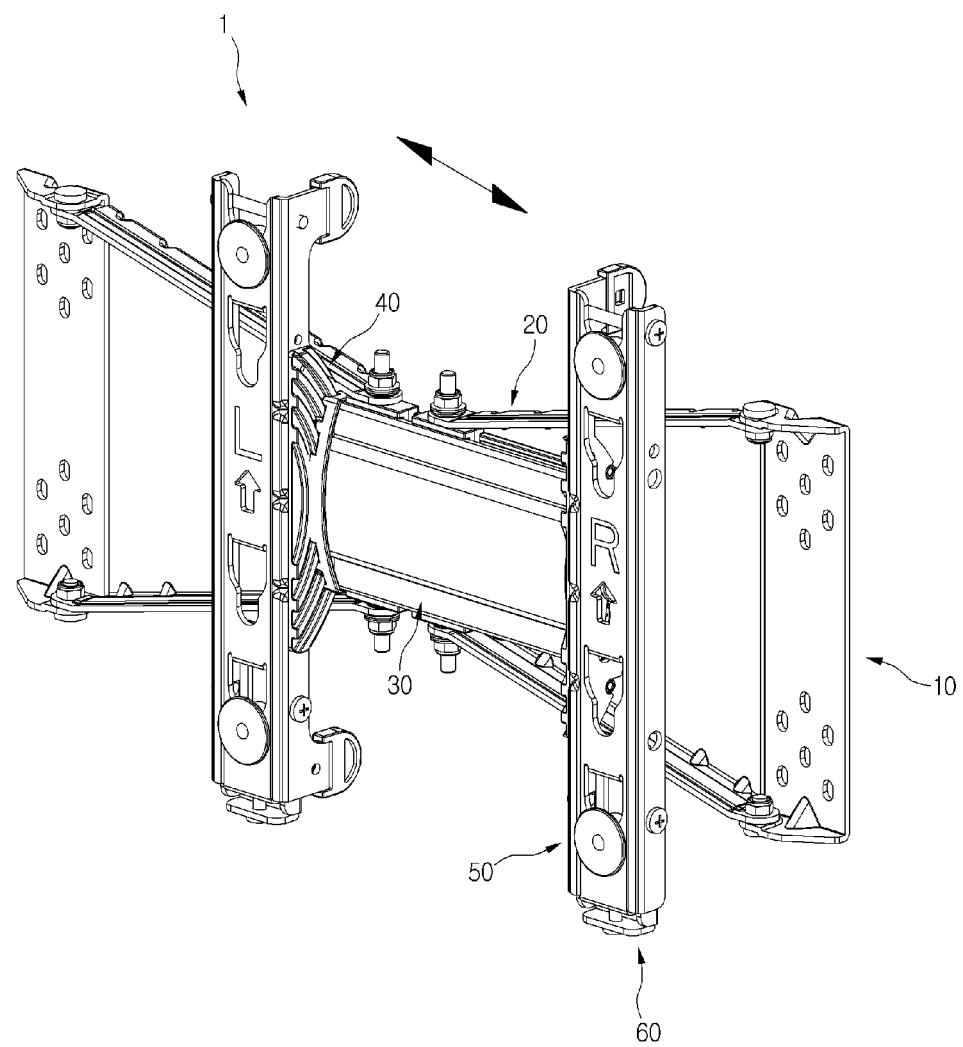
FIG. 12 is a perspective view of a supporting apparatus for a display device according to a third embodiment.

FIG. 12 is a perspective view of a supporting apparatus for a display device according to a third embodiment.

This third embodiment is identical to the first and second embodiments except that a structure for improving a degree of operational freedom is further applied to the supporting apparatus. Therefore, the components that are same as those of the first and second embodiments will not be described in this third embodiment.

Referring to FIG. 12, in this embodiment, the stopper member 33 disclosed in the first and second embodiments is omitted. Therefore, the display device can freely move in the left-right direction even in a state where the display device closely contacts the wall. It may be difficult to apply this embodiment to the built-in structure. However, the degree of operation freedom can be enhanced when the supporting apparatus is simply installed on the wall and thus the user convenience can be improved.

Figure 13:
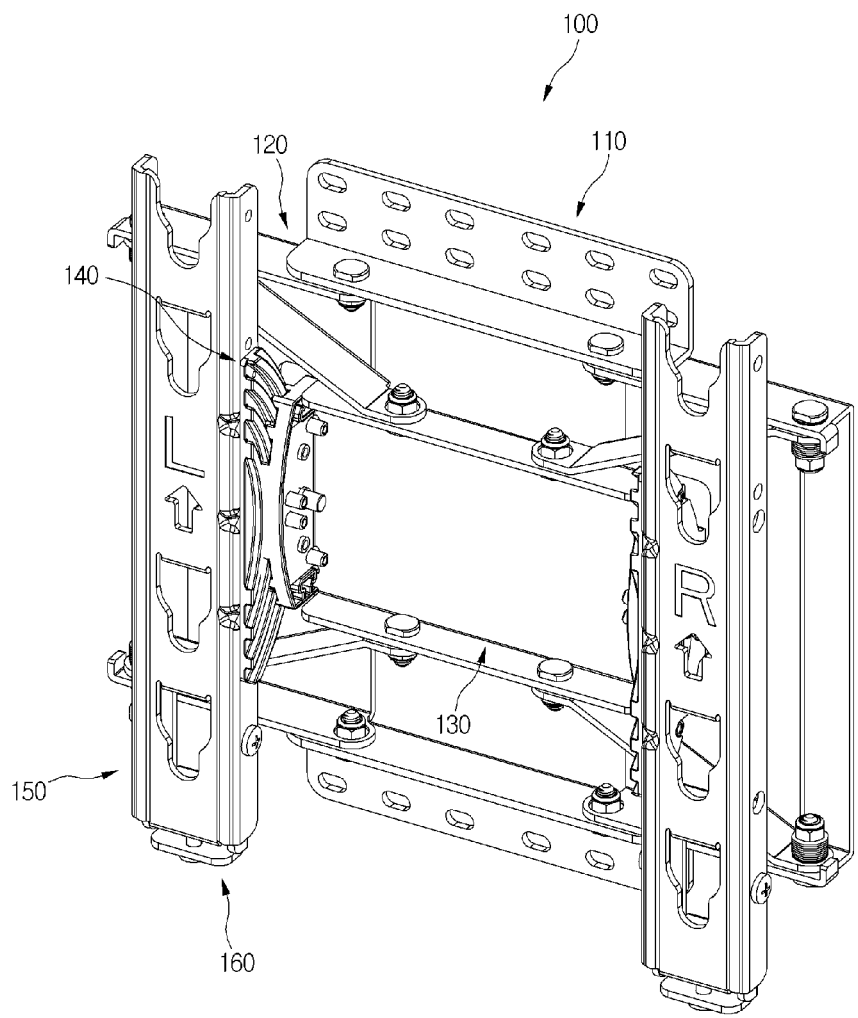
FIG. 13 is a perspective view of a supporting apparatus for a display device according to a fourth embodiment.

FIG. 13 is a perspective view of a supporting apparatus for a display device according to a fourth embodiment.

Although this fourth embodiment is difference from the foregoing embodiments, it can realize a variety of effects such as reduction in a size of the product, reduction in a portion observed from an external side, improvement of user satisfaction, improvement of production reliability, smooth operation of the product, maintenance of a predetermined location, appropriation to the built-in structure, low manufacturing costs, simple manufacturing process, and the like.

However, the components that are same as those of the foregoing embodiments will not be described in detail. In addition, for structures that are symmetrical in horizontal or vertical direction, only one part will be described and the other part will not be described. However, the same description may be applied to the other part.

Referring to FIG. 13, a supporting apparatus for a display device according to this fourth embodiment includes a stationary unit 110 that is fixed on, for example, a wall by fasteners such as bolts, a first connection unit 120 allowing the display device to rotate about a horizontal axis and move forward and rearward relative to the stationary unit 110, a second connection unit 130 that is connected to an outer end portion of the first connection unit 120 by a hinge, a device supporting unit 150 installed at opposite end portions of the second connection unit 130, and tilting frictional units 140 that are interposed between the second connection unit 130 and the device supporting units 150 to provide frictional force against tilting motion in a vertical direction.

Further, a height adjusting unit 160 is provided on a lower portion of the device supporting unit 150 to finely adjust the height of the display device.

Figure 14:
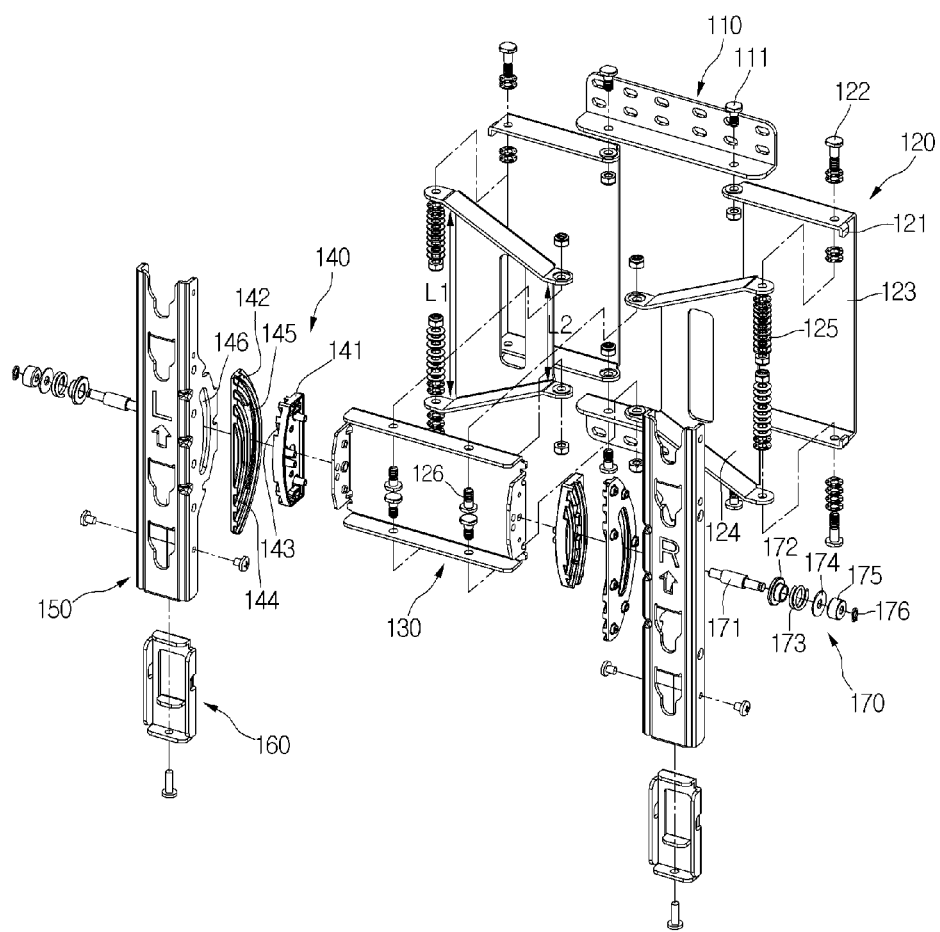
FIG. 14 is an exploded perspective view of the supporting apparatus according to the fourth embodiment.

FIG. 14 is an exploded perspective view of the supporting apparatus of FIG. 13.

Referring to FIG. 13, the first connection unit 120 includes first and second links 123 and 124. The stationary unit 100 is rotatably connected to an inner portion of the first link 123 with the first connection unit 120 interposed therebetween.

An outer portion of the first link 123 is connected to an outer portion of the second link 124 such that the links 123 and 124 moves toward each other or away from each other. By this operation, an end portion of the first connection unit 120 protrudes frontward or inserted inside. Further, a coupling member 122 and a washer 125 are inserted in a connection portion between the first and second links 123 and 124 to provide frictional force higher than a predetermined level.

Further, a stopper 121 is formed on the first link 123. When the second link 124 moves away from the first link 123 by a predetermined distance or more, the stopper 124 contacts the second link 124 so that the second line 124 cannot move any more away from the first link 123. Accordingly, a limitation supporting moment that is caused by a load of the display device in accordance with a drawn distance of the display device is to be set.

The inner portion of the second link 124 is rotatably connected to upper and lower portions of the second connection unit 130. The second connection unit 130 performs movement frontward or swivel motion in the left-right direction. The second connection unit 130 is folded on the second link 124 when the display device is completely moved toward the wall.

The tilting frictional units 140 are provided on left and right sides of the second connection unit 130. The tilting frictional unit 140 includes a first arc member 141 coupled to the second connection unit 130 and a second arc member 142 coupled to the device supporting unit 150. Further, the arc member 141, 142 is provided with a frictional groove 143, 144 and a frictional projection 143a, 144a to enhance the frictional force. In order to set a limitation in a vertical direction, the device supporting unit 150 and the second arc member 142 are respectively provided with arc slots 145 and 146. A bar 171 constituting a frictional force adjusting unit 170 is inserted through the arc slots 145 and 146 to set the rotational limitation of the device supporting unit 150.

The frictional force adjusting unit 170 includes, in addition to the bar 171 passing through the second connection unit 130, the arc members 141 and 142, and the device supporting unit 150, a lower plate 172, a spring 173, an upper plate 174, a tightening member 175, and a stopper ring 176, which are sequentially disposed on an outer surface of the device supporting unit 150. The fine adjustment of the frictional force of the tilting frictional unit 140 by the frictional adjusting unit 170 is already described above.

The height adjusting unit 160 is installed on a lowermost end of the device supporting unit 160 so that the height of the display device can be finely adjusted in a state where the stationary unit 110 is mounted.

The operation of this fourth embodiment by the above-described structure will be described in more detail with reference to FIGS. 15 to 17.

Figure 15:
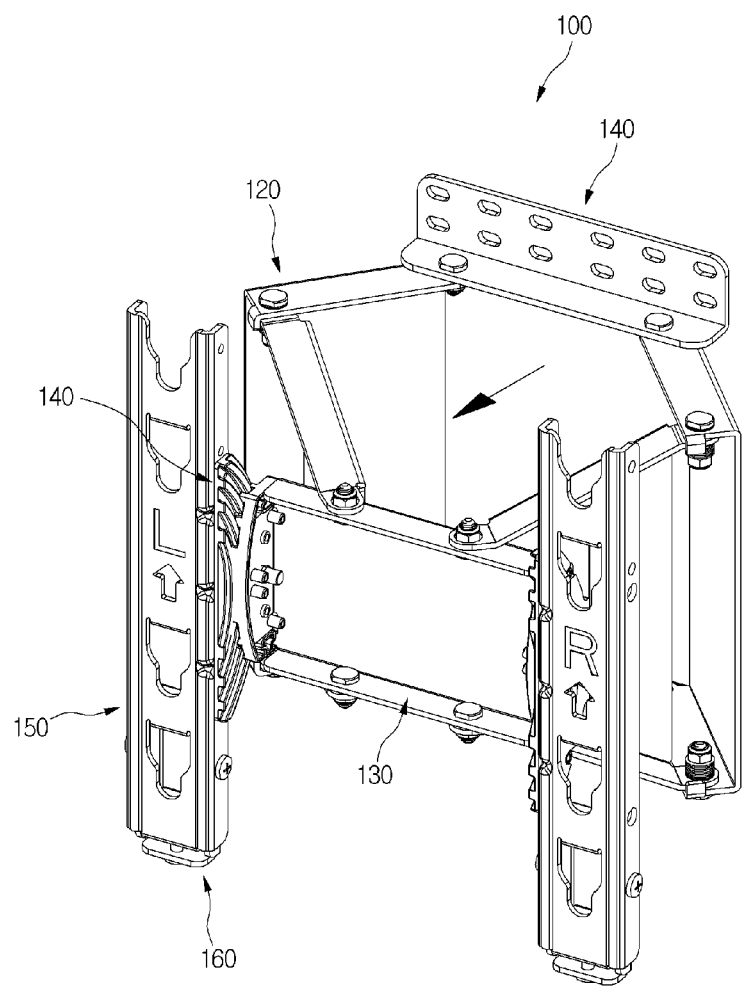
FIGS. 15 to 17 are views illustrating the operation of the fourth embodiment.
Figure 16:
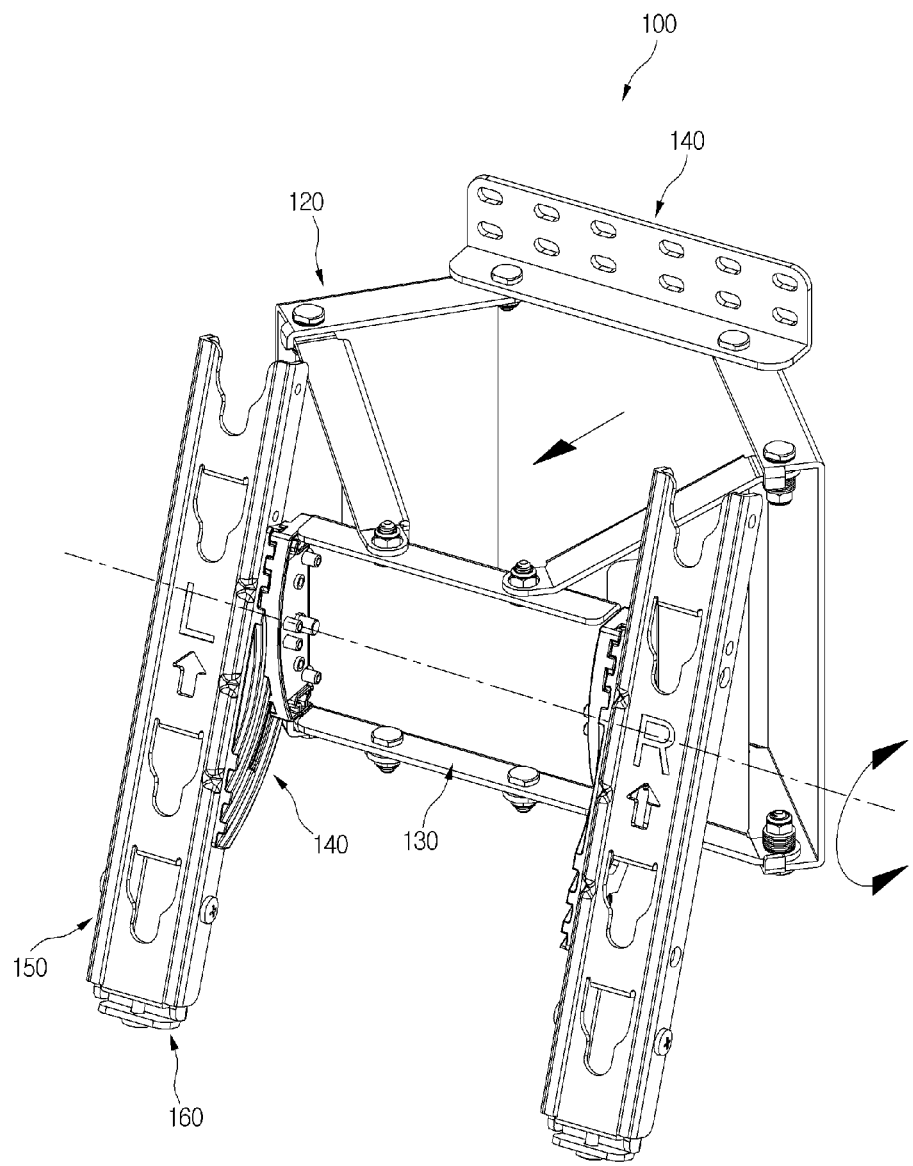
Figure 17:
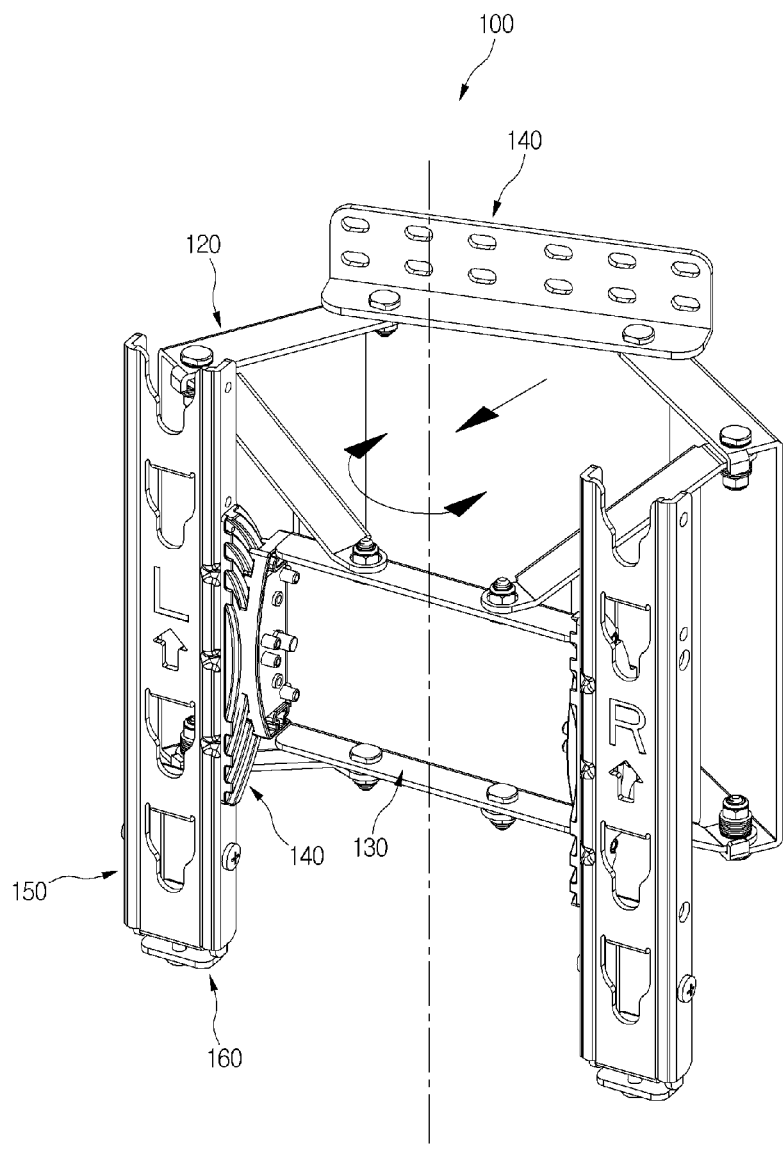

FIGS. 15 to 17 are views illustrating the operation of the fourth embodiment.

Referring to FIG. 15, when the user pulls the display device outward, the display device is drawn out as the links 123 and 124 of the first connection unit move away from each other.

Referring to FIG. 16, when the user tilts the display device in the vertical direction, the device supporting units 150 tilt in the vertical direction relative to the second connection unit 130. At this point, in order to prevent the display device from interfering with the wall, the display device may be drawn out by a predetermined angle.

FIG. 17, when the user swivels the display device in the left-right direction, the spreading distances of the links 123 and 124 constituting the first connection unit 120 become different from each other. Then, one of the left and right sides of the display device is more drawn out than the other of the left and right sides of the display device and thus the display device is in a tilted state in the left-right direction.

The above-described operations may be independently or simultaneously done to realize a variety of positions.

Although the stoppers 54 disclosed in FIG. 5 are not shown in this fourth embodiment, the stopper 54 may be installed on the rear surface of the device supporting unit 150.

Further, the supporting apparatus of this fourth embodiment is formed in a hexagonal link structure. That is, the second connection unit 130 functions itself as a link to realize the hexagonal link structure. This structure prevents the display device from easily tilting by external force while realizing the tilting frictional unit 140. That is, this structure allows the display device to swivel in the left-right direction only when the user applies force greater than a predetermined level and thus the user more conveniently adjust the position and posture of the display device.

Other embodiments in addition to the foregoing embodiments may be further proposed.

First, although it is described in the foregoing embodiments that the arc members of the tilting frictional member are formed of plastic, it is also possible to one of the arc members is formed of the plastic and the other is formed of other materials such as metal. Even in this case, the apparatus can smoothly operate without generating noise. Needless to say, both of the arc members can be formed of metal if no noise is generated and a sufficient frictional coefficient can be obtained. However, it is preferable that the arc members are formed of resin to further reduce the noise and frictional force and attain a stable operation.

It is also disclosed in the above that the stoppers 54 are formed of soft rubber or plastic and separately prepared and installed on the protrusions 53. However, the present invention is not limited to this configuration. That is, the protrusions 53 may extend to a proper length such that extending ends of the protrusions contact the wall when the display device approaches the wall to the maximum.

However, when the stoppers are formed of the soft material, the stoppers do not make any scratch on the wall and absorbs the impact applied to the display device.

It is also disclosed in the foregoing embodiments that the tilting frictional unit is essentially provided. However, the tilting frictional unit is not essential. That is, when the tilting frictional unit is not omitted, no tilting motion is realized but other operational effects can be attained. However, when the tilting frictional unit is provided, the degree of movement of the display device is improved and thus the user convenience can be improved. Furthermore, the structure of the tilting frictional unit may be varied. This concept can be identically applied to the height adjusting unit.

Although embodiments have been described with reference to a number of illustrative embodiments thereof, it should be understood that numerous other modifications and embodiments can be devised by those skilled in the art that will fall within the spirit and scope of the principles of this disclosure.

The invention claimed is:

1. A supporting apparatus for a display device, the supporting apparatus comprising:
 a stationary base configured to be coupled to an installation surface;
 a device supporter configured to support a display device;

a connection device that connects the stationary device to the device supporter and that guides motion of the device supporter; and a tilting frictional device interposed between the connection device and the device supporter and that guides a tilting motion of the device supporter, wherein the tilting frictional device comprises:

a first arc guide fixed to the connection device; and a second arc guide fixed to the device supporter and engaged with the first arc guide, wherein the first arc guide and the second arc guide each include a plurality of frictional projections formed thereon and a plurality of frictional grooves formed therein, wherein the plurality of frictional projections formed on the first arc guide are received in and are configured to move along the plurality of frictional grooves formed in the second arc guide and the plurality of frictional projections formed on the second arc guide are received in and are configured to move along the plurality of frictional grooves formed in the first arc guide such that a frictional force is generated by contact between inner surfaces of the frictional grooves and corresponding wall surfaces of the frictional projections as the device supporter moves relative to the connection device.

2. The supporting apparatus according to claim 1, wherein the plurality of frictional projections and the plurality of frictional grooves are alternately formed on the first and second arc guides, and wherein respective contact surfaces the plurality of frictional projections and the plurality of frictional grooves of the first and second arc guides have an arc-shape.

3. The supporting apparatus according to claim 1, further comprising a frictional force adjustor that adjusts the frictional force between contacting surfaces of the first and second arc guides.

4. The supporting apparatus according to claim 3, wherein the frictional force adjustor comprises:

a bar;

a spring provided around the bar, wherein the spring adjusts a normal force between the first and second arc guides; and a tightening device supported on the bar, wherein the tightening device contacts the spring and applies a tightening force to the spring.

5. The supporting apparatus according to claim 4, wherein the device supporter and the first and second arc guides respectively include arc slots through which the bar passes to guide movement of the device supporter, wherein the bar is connected to the connection device.

6. The supporting apparatus according to claim 1, wherein at least one of the first arc guide or the second arc guide is formed of plastic.

7. The supporting apparatus according to claim 1, wherein the connection device comprises:

a plurality of first connectors each having a first end rotatably connected to the stationary base; and a second connector, wherein second ends of the plurality of first connectors are movably connected to the second connector.

8. The supporting apparatus according to claim 7, wherein the second connector is slidably coupled to the second ends of the plurality of first connectors.

9. The supporting apparatus according to claim 7, wherein the first arc guide is connected to the second connector.

10. The supporting apparatus according to claim 7, wherein the each of the plurality of first connectors comprises:

a first link rotatably connected to the stationary base; and a second link rotatably connected to the first link and to the second connector.

11. The supporting apparatus according to claim 1, wherein the device supporter comprises:

at least one hook that selectively engages a seating device coupled to the display device; and a height adjusting device that selectively moves the seating device to adjust a height of the display coupled to the device supporter.

12. A supporting apparatus for a display device, the supporting apparatus comprising:

a stationary base;

a plurality of first connectors each having a first end rotatably connected to the stationary base;

a second connector, wherein second ends of the plurality of first connectors are slidably connected to the second connector;

a device supporter rotatably coupled to the second connector; and a tilting frictional device that couples the second connector to the device supporter and that guides a tilting motion of the device supporter relative to the second connector, wherein the tilting frictional device comprises:

a first arc guide fixed to the second connector; and a second arc guide fixed to the device supporter and engaged with the first arc guide, wherein frictional projections and frictional grooves are formed on contact surfaces of the first and second arc guides, with the frictional projections respectively received in the frictional grooves, such that a frictional force is generated between inner surfaces of the frictional grooves and corresponding wall surfaces of the frictional projections, wherein the frictional projections comprise a first frictional projection integrally formed with the first arc guide and a second frictional projection integrally formed with the second arc guide.

13. The supporting apparatus according to claim 12, further comprising a stopper provided at a middle portion of the second connector, wherein the stopper limits a sliding motion of the plurality of first connectors.

14. The supporting apparatus according to claim 12, further comprising:

a plurality of sliders slidably connected to the second connector; and a plurality of fasteners respectively connecting the plurality of sliders to the plurality of first connectors.

15. The supporting apparatus according to claim 14, wherein the second connector comprises a guide for guiding a sliding motion of the plurality of sliders.

16. A supporting apparatus for a display device, the supporting apparatus comprising:

a stationary base;

a plurality of first connectors rotatably connected to the stationary base;

a second connector to which the plurality of first connectors are rotatably connected;

a device supporter rotatably coupled to the second connector; and a tilting frictional device that couples the second connector to the device supporter and that guides a tilting motion of the device supporter relative to the second connector, wherein the tilting frictional device comprises:

a first arc guide fixed to the second connector; and
a second arc guide fixed to the device supporter, wherein frictional projections and frictional grooves are formed on contact surfaces of the first and second arc guides, with the frictional projections respectively received in the frictional grooves, such that a frictional force is generated between inner surfaces of the frictional grooves and corresponding wall surfaces of the frictional projections, wherein the frictional projections comprise a first frictional projection formed on the first arc guide and a second frictional projection formed on the second arc guide, and the frictional grooves comprise a first frictional groove formed in the first arc guide and a second frictional groove formed in the second arc guide, and wherein the first frictional projection is configured to move in the second frictional groove and the second frictional projection is configured to move in the first frictional groove as the device supporter moves relative to the second connector.

17. The supporting apparatus according to claim 16, wherein the plurality of first connectors comprise a plurality of links.

18. The supporting apparatus according to claim 16, wherein the plurality of first connectors and the second connector are folded against each other at a predetermined location of the second connector.

19. The supporting apparatus according to claim 16, further comprising protrusions provided at a rear surface of the device supporter, and stoppers fitted around the protrusions so as to prevent an impact as the device supporter moves toward the installation surface.

* * * * *